United States Patent [19]

Fujimori et al.

[11] 4,325,812
[45] Apr. 20, 1982

[54] PROCESS FOR CRACKING HEAVY HYDROCARBONS INTO LIGHT OILS AND PRODUCING HYDROGEN

[75] Inventors: Kuniaki Fujimori, Tokyo; Teruo Suzuka, Kawaguchi; Yukio Inoue, Urawa; Shirou Aizawa, Toda, all of Japan

[73] Assignee: Research Association for Residual Oil Processing, Tokyo, Japan

[21] Appl. No.: 191,617

[22] Filed: Sep. 29, 1980

[30] Foreign Application Priority Data

Sep. 29, 1979 [JP] Japan ................................. 54/124735

[51] Int. Cl.³ ............................................. C10G 11/04
[52] U.S. Cl. .................................... 208/119; 208/121; 252/459; 252/466 J; 252/472
[58] Field of Search ............................... 208/107–124; 423/148, 658

[56] References Cited

U.S. PATENT DOCUMENTS

| | | | |
|---|---|---|---|
| 2,635,947 | 4/1953 | Reed et al. | 423/658 |
| 2,888,395 | 5/1959 | Henny | 423/658 X |
| 3,017,250 | 1/1962 | Watkins | 423/658 X |
| 4,224,140 | 9/1980 | Fujimori et al. | 208/124 |

*Primary Examiner*—Delbert E. Gantz
*Assistant Examiner*—G. E. Schmitkons
*Attorney, Agent, or Firm*—Sughrue, Mion, Zinn, Macpeak and Seas

[57] ABSTRACT

A process is described for cracking a heavy hydrocarbon to form a light oil and for producing hydrogen by the use of a catalyst containing at least 30 wt % Fe which comprises a first step wherein steam and heavy hydrocarbon are simultaneously contacted with the catalyst in a reduced state to produce hydrogen, cracked gases, and a cracked light oil, to oxidize the reduced-state catalyst, and to deposit coke on the catalyst; and a second step wherein the oxidized-state catalyst on which said coke is deposited is contacted with an oxygen-containing gas insufficient for achieving complete combustion of the coke, to thereby partially combust the coke and regenerate the catalyst to a reduced state.

15 Claims, No Drawings

PROCESS FOR CRACKING HEAVY HYDROCARBONS INTO LIGHT OILS AND PRODUCING HYDROGEN

BACKGROUND OF THE INVENTION

This invention provides a process for cracking heavy hydrocarbons to form light oils and for producing hydrogen. More particularly, the invention relates to a process wherein both steam and heavy hydrocarbons are brought into contact with a catalyst containing iron in a reduced state, to thereby produce hydrogen, cracked gases, and cracked light oils, and then burning the coke deposited on the catalyst to gasify and simultaneously reduce the catalyst for its regeneration.

Some of the present inventors previously proposed a process for catalytically cracking vacuum residual oil and other heavy hydrocarbons into light oils in the presence of a laterite catalyst, wherein the coke deposited on the catalyst is burnt to reduce the iron oxide in the catayst, and then the reduced catalyst is contacted with steam to produce hydrogen (see Japanese patent application (OPI) No. 47708/79—the term "OPI" as used herein means a "published unexamined Japanese patent application").

Further, methods of cracking or gasifying heavy hydrocarbons and producing hydrogen in from three to six steps are known (see, for example, Japanese Patent Publication No. 30596/75 and U.S. Pat. Nos. 3,017,250, 2,888,395 and 2,635,947). However, no method is known that is capable of achieving these reactions effectively by two steps and using a single catalyst.

We have found that if both a heavy hydrocarbon and steam are cracked in the presence of a catalyst containing iron in a reduced state, the reactions listed below proceed simultaneously: (1) cracking of the heavy hydrocarbon into a light oil and a cracked gas and coking; (2) the reaction between $H_2O$ and iron in a reduced state to generate hydrogen, and the oxidation of that iron; and (3) the reaction between $H_2O$ and iron sulfide (generated in the regeneration step) to generate hydrogen sulfide, and the oxidation of iron sulfide.

We have also found that the following reactions proceed simultaneously if the catalyst containing iron in an oxidized state that has deposited thereon sulfur-containing coke resulting from the catalyst cracking step is burnt with oxygen insufficient for complete combustion of the coke; (1) partial combustion of the coke; (2) reduction of the iron in an oxidized state by the coke and carbon monoxide; (3) and the reaction between gasified sulfur compounds and the reduced iron to form iron sulfide.

SUMMARY OF THE INVENTION

Therefore, a primary object of this invention is to provide an industrially advantageous process for cracking heavy hydrocarbons and producing hydrogen using only two steps and without using an apparatus wherein the temperature must be elevated to at least 950° C.

The process of this invention for cracking heavy hydrocarbons to form light oils and for producing hydrogen by the use of a catalyst containing at least 30 wt% Fe comprises the following two steps: a first step wherein steam and heavy hydrocarbons are simultaneously contacted with the catayst in a reduced state to produce hydrogen, cracked gases, and cracked light oils, to oxidize the reduced-state catalyst, and to deposit coke on the cataylst; and a second step wherein the catalyst in an oxidized state on which the coke is deposited is contacted with an oxygen-containing gas insufficient for achieving complete combustion of the coke, to thereby partially combust the coke on said catalyst and regenerate the catalyst to a reduced state.

DETAILED DESCRIPTION OF THE INVENTION

The term "a catalyst containing at least 30 wt% Fe" as used herein assumes that the catalyst has been prepared by suitable means such as calcination in a conventional oxidizing atmosphere; thus the term refers to a catalyst which, when most of iron in the catalyst is in the form of $Fe_2O_3$, contains at least 30 wt% iron (Fe). Such catalyst can be prepared by pulverizing, kneading, granulating and calcining materials by the conventional manners, which materials have a high iron content, such as natural ores containing iron in the form of hydroxide, oxide or carbonate, (e.g., laterite, magnetite, siderite, limonite, and hematite), or chemical compositions of iron oxides, hydroxides or carbonates, or mixtures thereof with inorganic refractory materials, such as alumina, silica, magnesia, calcium hydroxide, and nickel oxide, and natural ores, e.g., garnierite, dolomite and limestone. To have high catalytic activity, these catalysts preferably have a specific surface area of from 0.1 to 30 $m^2/g$, and for use in a fluidized bed, the catalyst particles preferably have a mean diameter of from 60 to 600μ. If the Fe content of the catalysts is below 30wt%, only a small amount of hydrogen is produced. Therefore, it is essential that the catalysts contain at least 30 wt% of Fe. The Fe content preferably does not exceed 70 wt% because otherwise bogging (i.e., sintering and agglomeration of catalyst particles) occurs during reduction of the catalyst in the second step.

The terms "in an oxidized state" and "in a reduced state" are used herein as a relative measure of the degree of reduction of iron in the catalyst particles. The degree of reduction (R) of the catalyst particles can be represented by the following formula:

$$R = \left[ 1 - \frac{\text{gram-atoms of oxygen which Fe in the catalyst possesses}}{3/2 \times (\text{gram-atoms of Fe in the catalyst})} \right] \times 100$$

If $R_1$, which is the degree of reduction of the catalyst at the end of the first step, is smaller than $R_2$, which is the degree of reduction of the catalyst at the end of the second step, this invention achieves its object, and the greater the difference between $R_2$ and $R_1$, the greater the amount of hydrogen that will be generated per given amount of catalyst recycled to the first step. Therefore, according to this invention, a catalyst having a degree of reduction of $R_1$ is referred to as a catalyst in an oxidized state (or as an oxidized-state catalyst), whereas the catalyst having a degree of reduction of $R_2$ is referred to as a catalyst in a reduced state (or as a reduced-state catalyst). Both $R_1$ and $R_2$ are preferably greater than 11.1%; $R_2$ is preferably in the range of from 12 to 34%, and more preferably from 15 to 30%.

The heavy hydrocarbons that can be cracked to light oils with advantage by this invention include the relatively inexpensive high-boiling residual oils having more than 10 wt% Conradson carbon such as atmospheric residual oil, vacuum residual oil, solvent-deasphalting residue, tar sand, and shale oil.

In the first step of the process of this invention, steam is supplied to a catalyst bed filled with the particles of a catalyst in a reduced state which are held at a temperature between about 450° and 600° C. and a pressure between about 0 and 15 kg/cm$^2$G. As a result of the steam-iron reaction, steam is decomposed to generate hydrogen and oxidize the catalyst particles in a reduced state. Simultaneously, a heavy hydrocarbon is supplied to the catalyst bed by the steam atomizing method to thereby crack the heavy hydrocarbon. In the first step, the catalyst preferably forms a fluidized bed using the steam as a fluidizing gas. The heavy hydrocarbon thereby breaks down to form cracked gases, cracked light oils, and coke. The coke is deposited on the catalyst particles. The amount of the coke deposited on the catalyst increases with the content of Conradson carbon in the heavy hydrocarbon and with the progress of the cracking reaction in the first step. For the purpose of this invention, the amount of coke deposited is preferably from 2 to 15 wt%, and more preferably from 2 to 10 wt%, based on the weight of the catalyst. If the amount of coke deposited is too small, the iron oxide in the catalyst is not reduced adequately, or, to provide a good heat balance for the reaction system, additional heat must be supplied in a great quantity from an external source. If the amount of coke deposited on the catalyst is too high, the catalytic activity of the catalyst is decreased or the reaction between the steam and the reduced-state iron is inhibited to decrease the amount of hydrogen generated. The reduced-state iron in the catalyst (typically wustite) reacts with steam to generate hydrogen and becomes iron in an oxidized state (typically magnetite). In other words, the catalyst in a reduced state turns to the catalyst in an oxidized state. Part of iron sulfide that is present in the catalyst which is formed by capturing sulfur in the subsequent regeneration step also reacts with steam to be converted to iron oxide and hydrogen sulfide to generate the ability of the catalyst to capture sulfur. The last-mentioned reaction proceeds faster if the amount of steam supplied is increased and the reaction temperature is raised. The coke on the catalyst reacts with steam to a slight extent to generate hydrogen, carbon monoxide and carbon dioxide, but this reaction is insignificant at a temperature lower than 600° C. The amount of heavy hydrocarbon supplied to the first step is properly determined depending upon the amount of coke deposited and the amount of catalyst particles recycled to the first step, whereas the amount of steam supplied is properly selected based on the degree of reduction of the catalyst, the desired amount of hydrogen generated and the amount of catalyst particles recycled to the first step. It is economically preferred that more than 10 wt% of the steam is decomposed in the first step.

Hydrogen and hydrogen sulfide thus generated in the reactions described above are discharged from the reaction system in the form of a gas and vapor containing cracked gases, light oils, uncracked heavy hydrocarbon and steam. The discharged gas and vapor enter into a scrubber or distillation column where they are freed of the uncracked heavy hydrocarbon which is recycled to the feedstock and subjected to further cracking. Hydrogen, cracked gases, and the light oil are supplied to the refining step for recovery. The cracked gases and hydrogen are recovered from the refining step as a gaseous mixture which contains hydrogen as the major component plus methane, ethane, ethylene, $C_3$ fractions, $C_4$ fractions, and $H_2S$. By purifying the mixture by suitable means, such as distillation, an amine absorption method, a pressure swing adsorption method (PSA method (see, for example, CEP, January (1976), pp. 44–49)), or cryogenic processing (see, for example, CEP, September (1969), pp. 78–83)), which may be used alone or in combination, the mixture can be recovered as three substances, i.e., high-purity hydrogen gas, high-concentration hydrogen sulfide gas and cracked gases. For example, the mixture can first be freed of $C_3$ and $C_4$ fractions by distillation or absorption, then freed of $H_2S$ by amine absorption, and then freed of hydrogen and light hydrocarbon gases such as methane and ethylene by the PSA method or cryogenic processing. The cracked light oil is fed to the refining step where it is separated into a naphtha fraction, kerosine fraction, gas oil fraction, etc. which are desulfurized in a desulfurization step to provide the desired end products.

In the second step of this invention, the catalyst in an oxidized state with coke deposited thereon is converted to a reduced state by contacting it with an oxygen-containing gas at a temperature from about 750° to 950° C. and a pressure from about 0 to 15 kg/cm$^2$G. The catalyst preferably forms a fluidized bed using the oxygen-containing gas as a fluidizing gas as in the preceding cracking step. The amount of oxygen supplied to the second step is preferably from 0.1 to 0.6 mol, and more preferably from 0.2 to 0.4 mol, per mol of carbon supplied to the second step. In the second step, the coke deposited and CO gas react with iron in an oxidized state in the catalyst to form iron in a reduced state (typically wustite). Therefore, the catalyst in an oxidized state is converted to a catalyst in a reduced state. As specified hereinbefore, the degree of reduction in the second step is preferably from about 12 to 34%. The degree of reduction preferably should not exceed 34%, because otherwise bogging easily occurs during the reduction of the catalyst. In the second step, the coke on the catalyst reacts with oxygen in the oxygen-containing gas and oxygen in the iron oxide in the catalyst to form gases such as CO and $CO_2$. Simultaneously with gasification of coke, part of the resulting iron in a reduced state captures, as iron sulfide, gaseous sulfur compounds such as $H_2S$, COS, and $SO_x$ that have been formed as a result of gasification of the sulfur compounds in the coke. Hence, the large quantity of exhaust gas from the second step contains a very low level of sulfur compounds. As the reaction temperature is higher and more coke is deposited on the catalyst, the reactions described above proceed faster. It is preferred that the reaction temperature not exceed 950° C. because otherwise bogging makes the fluidization of the catalyst difficult in a high-temperature reducing atmosphere. Hence, the reactions in the second step are preferably performed at a temperature between about 750° and 950° C. The temperature can be maintained in this range by the partial combustion of coke. It is to be understood that if there is the possibility that the heat balance in the reaction system may be upset, the system may be cooled or heated by a conventional external or internal means. Cooling can be achieved simply using a boiler type fluidized bed, and heating can be simply achieved by supplying the reaction system with torch oil directly. The amount of heat generated in the reaction system can also be controlled by varying the amount of oxygen in the fluidizing gas, but if the amount of oxygen is increased, iron oxides are not adequately reduced, and if the amount of oxygen is decreased, the amount of residual coke on the catalyst can increase and have an adverse effect on the cracking reaction and the generation of hydrogen. Therefore, it is necessary that the molar ratio of $O_2/C$ be kept within the above defined range.

The catalyst thus-freed of coke and rendered to a reduced state is desirably recycled to the first step for further cracking of heavy hydrocarbons and generation of hydrogen. The gases resulting from the reduction of the catalyst and partial combustion of coke are discharged outside the reaction system as a less polluting emission substantially free of hydrogen sulfide, sulfurous acid and NOx. Advantageously, the emission is connected to a power recovery step using a conventional gas expander or a heat energy recovery step using a conventional CO boiler. In an industrially advantageous embodiment of this invention, the catalyst is recycled through two reaction columns, one for cracking heavy hydrocarbons and generating hydrogen, and the other for gasifying coke and regenerating the catalyst by reduction.

As discussed in the foregoing, the process of this invention achieves efficient cracking of relatively inexpensive heavy hydrocarbons having a high content Conradson carbon and provides light oils and hydrogen without producing large quantities of polluting substances.

This invention is now described in greater detail by reference to the following examples and reference examples, which are provided for illustrative purposes only and are not intended to limit the scope of the invention.

EXAMPLE 1 AND REFERENCE EXAMPLE 1

A laterite ore containing 55.1 wt% Fe, 1.26 wt% Ni, 2.6 wt% MgO, 4.7 wt% $SiO_2$ and 2.81 wt% $Al_2O_3$ was granulated into particles having a mean diameter of 1.2 mm. The particles were calcined at 1160° C. for 3 hours to make catalyst particles. The catalyst was reduced with hydrogen at 850° C. to form a catalyst in a reduced state. The degree of reduction of the catalyst was 33.3%. The catalyst was used to crack Kuwait vacuum residual oil (specific gravity $d_4^{15}$: 1.020; residual carbon: 21.2 wt%) under the conditions indicated in Table 1 below. The results of cracking are set forth in Table 2 in the column headed "Example 1". A catalyst was prepared in the same manner as described above except that the calcined catalyst was not reduced, and it was used to crack the same Kuwait vacuum residual oil under the same conditions. The results of cracking are also set forth in Table 2 in the column headed "Reference Example 1".

TABLE 1

| Cracking Temperature | 540° C. |
| --- | --- |
| Run Time | 15 min |
| Water Supplied | 0.38 g/g of feedstock |
| WHSV | 0.696 h$^{-1}$ |
| Catalyst in Bed | 405 g |

TABLE 2

| Yield (wt %) | Example 1 | Reference Example 1 |
| --- | --- | --- |
| Cracked Gases | 8.4 | 12.1 |
| Naphtha Fraction ($C_5$ ~ 180° C.) | 17.8 | 15.9 |
| Kerosine Fraction (180 ~ 230° C.) | 1.8 | 3.1 |
| Gas Oil Fraction (230 ~ 310° C.) | 4.2 | 5.3 |
| VGO (Vacuum Gas Oil) Fraction (310 ~ 560° C.) | 24.5 | 24.4 |
| Uncracked Oil (560° C.~) | 23.6 | 22.5 |

TABLE 2-continued

| Yield (wt %) | Example 1 | Reference Example 1 |
| --- | --- | --- |
| Coke | 21.4 | 16.4 |
| Hydrogen generated (Nl) | 30.7 | 0.06 |
| Conversion (wt %) | 77.5 | 76.4 |

The above data shows that the reaction of generating hydrogen proceeds simultaneously with the cracking reaction in the presence of the reduced catalyst of this invention, but substantially does not occur in Reference Example 1.

EXAMPLE 2 AND REFERENCE EXAMPLE 2

An iron oxide based catalyst containing 49.7 wt% Fe, 1.44 wt% Ni, 5.54 wt% MgO, 8.61 wt% $SiO_2$ and 2.85 wt% $Al_2O_3$ was granulated into particles having a mean diameter of 0.2 mm. The catalyst particles were calcined at 1160° C. for 3 hours to form an iron-nickel catalyst which was then reduced with hydrogen at 850° C. to provide a catalyst in a reduced state. The degree of reduction of the catalyst was 20%. Kuwait vacuum residual oil as used in Example 1 was cracked with the resulting catalyst under the conditions indicated in Table 1. The results are shown in Table 3 in the column headed "Example 2".

Then the same Kuwait residual oil was cracked with the same catalyst under the same conditions as above, except that instead of water indicated in Table 1, the cracking column was supplied with 0.5 Normal liters of $N_2$ gas per gram of the feedstock. The results of this cracking are set forth in Table 3 below in the column headed "Reference Example 2".

TABLE 3

| Yield (wt %) | Example 2 | Reference Example 2 |
| --- | --- | --- |
| Cracked Gases | 8.4 | 8.6 |
| Naphtha Fraction ($C_3$ ~ 180° C.) | 9.0 | 9.0 |
| Kerosine Fraction (180 ~ 230° C.) | 3.5 | 1.5 |
| Gas Oil Fraction (230 ~ 310° C.) | 6.4 | 1.8 |
| VGO Fraction (310 ~ 560° C.) | 27.2 | 16.5 |
| Uncracked Oil (560° C.~) | 26.5 | 40.7 |
| Coke | 19.1 | 21.9 |
| Hydrogen generated (Nl) | 15.9 | 2.8 |
| Conversion (wt %) | 73.5 | 59.1 |

The data shows that hydrogen was generated in the example according to the invention, but not in the reference example.

EXAMPLE 3

A laterite ore used in Example 1 was granulated and calcined as described in Example 2. The resulting catalyst was recycled through a stainless steel cracking column (ID: 12.7 cm, height: 160 cm) and a stainless steel regenerating column (ID: 15.1 cm, height: 180 cm) as it formed a fluidized bed under the conditions indicated in Table 4. The cracking column was continuously fed with the same vacuum residual oil as was used in Example 1. All of the uncracked oil was recycled to the cracking column as a feedstock. The results of cracking and regeneration are shown in Table 5 below.

TABLE 4

| Cracking Column | Temperature | 640° C. |
| --- | --- | --- |
| | Pressure | 1 kg/cm$^2$G |
| | Catalyst hold up | 13 Kg |

TABLE 4-continued

| | | |
|---|---|---|
| | Catalyst recycled | 39 Kg/hr |
| | Feedstock supplied | 4 Kg/hr |
| | Steam supplied | 2 Kg/hr |
| Regenerated Column | Temperature | 850° C. |
| | Pressure | 1 Kg/cm²G |
| | Catalyst hold up | 20 Kg |
| | Air supplied | 5 Nm³/hr |
| Torch oil | 0.06 Kg/hr | |

TABLE 5

| | | |
|---|---|---|
| Cracking Column | Yield of cracked gases | 35 wt % |
| | Yield of $C_5 \sim 180°$ C. fraction | 20 wt % |
| | Yield of $C_5$ 180 $\sim$ 230° C. fraction | 6 wt % |
| | Yield of $C_5$ 230 $\sim$ 310° C. fraction | 4 wt % |
| | Yield of $C_5$ 310 $\sim$ 360° C. fraction | 7 wt % |
| | Yield of coke | 5.5 wt % |
| | Hydrogen generated | 2.2 Nm³/hr |
| | Conversion | 72 wt % |
| | Molar Concentration of $H_2$ in cracked gases | 78% |
| | Molar Concentration of $H_2S$ in cracked gases | 0.5% |
| Regenerating Column | Gases generated | 6.7 Nm³/hr |
| | Molar ratio of CO in gases generated | 14.5% |
| | Molar ratio of $CO_2$ in gases generated | 14.5% |
| | Molar ratio of $H_2S$ and $SO_x$ in gases generated | 200 ppm |
| | Molar ratio of $NO_x$ in gases generated | trace |

As is clear from Table 5, the exhaust gas from the regenerating column contained only a very small amount of $SO_x$ and $NO_x$, indicating that the process of this invention is very advantageous from a view point of pollution control.

While the invention has been described in detail and with reference to specific embodiments thereof, it will be apparent to one skilled in the art that various changes and modifications can be made therein without departing from the spirit and scope thereof.

What is claimed is:

1. A process for cracking a heavy hydrocarbon to form a light oil and for producing hydrogen by the use of a catalyst containing at least 30 wt% Fe which comprises a first step wherein steam and heavy hydrocarbon are simultaneously contacted with the catalyst in a reduced state to produce hydrogen, cracked gases, and cracked light oils, to oxidize the reduced-state catalyst, and to deposit coke on the catalyst, and a second step wherein the oxidized-state cataystt on which said coke is deposited is contacted with an oxygen-containing gas insufficient for achieving complete combustion of the coke, to thereby partially combust the coke and regenerate said catalyst to a reduced state.

2. A process according to claim 1, wherein the first step is performed at a temperature from about 450° C. to 600° C. and a pressure from about 0 to 15 kg/cm²G.

3. A process according to claim 1, wherein the second step is performed at a temperature from about 750° C. to 950° C. and a pressure from about 0 to 15 kg/cm²G.

4. A process according to claim 1, wherein the oxidized-state catalyst with said coke deposited formed thereon is contacted with from 0.1 to 0.6 mol of oxygen per mol of carbon supplied to the second step.

5. A process according to claim 1, wherein the oxidized-state catalyst with said coke deposited formed thereon is contacted with from 0.2 to 0.4 mol of oxygen per mol of carbon supplied to the second step.

6. A process according to claim 1, wherein the degree of reduction of the reduced-state catalyst is from 12 to 34%.

7. A process according to claim 1, wherein the degree of reduction of the reduced-state catalyst is from 15 to 30%.

8. A process according to claim 1, wherein more than 10 wt% of the steam is decomposed in the first step.

9. A process according to claim 1, wherein the catalyst containing at least 30 wt% Fe is prepared by pulverizing, kneading, granulating and calcining one or more iron substances.

10. A process according to claim 1, wherein the catalyst containing at least 30 wt% Fe is prepared by pulverizing, kneading, granulating and calcining one or more iron substances with inorganic refractory materials.

11. A process according to claim 9 or 10, wherein the iron substance is selected from the group consisting of an iron hydroxide, an iron oxide and an iron carbonate.

12. A process according to claim 9 or 10, wherein the iron substance is an ore selected from the group consisting of laterite, siderite, magnetite, hematite and limonite.

13. A process according to claim 10, wherein the inorganic refractory material is selected from the group consisting of alumina, silica, magnesia, calcium hydroxide, nickel oxide, garnierite, dolomite, and limestone.

14. A process according to claim 1, wherein said catalyst has a specific surface area of from 0.1 to 30 m²/g.

15. A process according to claim 1, wherein said process further employs a fluidized bed and catalyst particles having a mean diameter of from 60 to 600μ.

* * * * *